(12) United States Patent
Horie et al.

(10) Patent No.: US 8,969,462 B2
(45) Date of Patent: *Mar. 3, 2015

(54) RUBBER COMPOSITION

(75) Inventors: Satoshi Horie, Tokyo (JP); Takaaki Igarashi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/114,252

(22) PCT Filed: Apr. 27, 2012

(86) PCT No.: PCT/JP2012/061487
§ 371 (c)(1),
(2), (4) Date: Jan. 8, 2014

(87) PCT Pub. No.: WO2012/147973
PCT Pub. Date: Nov. 1, 2012

(65) Prior Publication Data
US 2014/0142235 A1    May 22, 2014

(30) Foreign Application Priority Data

Apr. 28, 2011  (JP) ................. 2011-102326

(51) Int. Cl.
C08L 9/06 (2006.01)
C08K 3/36 (2006.01)
(52) U.S. Cl.
USPC ......................... 524/492; 524/493
(58) Field of Classification Search
CPC ............ C08L 9/06; C08K 3/36; C08K 5/548; C08K 7/00; C08K 3/04; C08K 5/31; C08K 13/02
USPC ................................. 524/493, 492
See application file for complete search history.

(56) References Cited

U.S. PATENT DOCUMENTS

| 5,674,932 A * | 10/1997 | Agostini et al. ............... 524/430 |
| 6,420,488 B1 | 7/2002 | Penot |
| 2001/0034389 A1 | 10/2001 | Vasseur |
| 2003/0105242 A1 | 6/2003 | Penot |
| 2003/0144394 A1 | 7/2003 | Penot et al. |

FOREIGN PATENT DOCUMENTS

| JP | 2002-521515 A | 7/2002 |
| JP | 2002-521516 A | 7/2002 |
| JP | 2003-523472 A | 8/2003 |
| JP | 2003-530443 A | 10/2003 |
| JP | 2007-154130 A | 6/2007 |
| JP | 2009-256576 A | 11/2009 |
| JP | 2010-031260 A | 2/2010 |
| JP | 2010-248422 A | 11/2010 |
| JP | 2010-248423 A | 11/2010 |
| JP | 2011-026380 A | 2/2011 |
| WO | 2008/123306 A1 | 10/2008 |
| WO | 2010/126095 A1 | 11/2010 |

* cited by examiner

Primary Examiner — Robert D. Harlan
(74) Attorney, Agent, or Firm — Sughrue Mion, PLLC

(57) ABSTRACT

The present invention provides a rubber composition containing: (A) a rubber component containing from 90 to 100% by mass of at least one kind of diene rubber synthesized by solution polymerization and from 0 to 10% by mass of another kind of diene rubber; (B) silica having a n-hexadecyltrimethylammonium bromide (CTAB) adsorption specific surface area of 140 m$^2$/g or more and less than 180 m$^2$/g measured according to a method described in ASTM D3765-92; (C) at least one silane coupling agent selected from a polysulfide compound and a thioester compound; and (D) a vulcanization accelerator, the rubber composition after vulcanization having an average aggregated aggregate area (nm$^2$) of the silica of 2,200 or less, and thus provides a rubber composition that is improved in low-heat-generation property.

8 Claims, 4 Drawing Sheets

RUBBER COMPOSITION

CROSS REFERENCE TO RELATED APPLICATIONS

This is a National Stage of International Application No. PCT/JP2012/061487, filed Apr. 27, 2012, claiming priority from Japanese Patent Application No. 2011-102326, filed Apr. 28, 2011, the contents of all of which are incorporated herein by reference in their entirety.

TECHNICAL FIELD

The present invention relates to a rubber composition containing silica, which has an improved low-heat-generation property.

BACKGROUND ART

Recently, in association with the movement of global regulation of carbon dioxide emission associated with the increase in attraction to environmental concerns, the demand for low fuel consumption by automobiles is increasing. To satisfy the requirement, it is desired to reduce rolling resistance relating to tire performance. Heretofore, as a means for reducing the rolling resistance of tires, a method of optimizing tire structures has been investigated; however, at present, a technique of using a low-heat-generating rubber composition for tires has become employed as the most common method.

For obtaining such a low-heat-generating rubber composition, there is known a method of using an inorganic filler such as silica or the like.

However, in the rubber composition containing silica compounded therein, silica aggregates (owing to the hydroxyl group in the surface of silica), and therefore, for preventing the aggregation, a silane coupling agent is used.

Accordingly, for successfully solving the above-mentioned problem by incorporation of a silane coupling agent, various trials have been made for increasing the activity of the coupling function of the silane coupling agent.

For example, PTL 1 proposes a rubber composition containing, as basic components, at least (i) one diene elastomer, (ii) a white filler as a reinforcing filler and (iii) an alkoxysilane polysulfide as a coupling agent (white filler/diene elastomer) along with (iv) an enamine and (v) a guanidine derivative.

PTL 2 discloses a rubber composition containing, as basic components, at least (i) one diene elastomer, (ii) a white filler as a reinforcing filler and (iii) an alkoxysilane polysulfide as a coupling agent (white filler/diene elastomer) along with (iv) zinc dithiophosphate and (v) a guanidine derivative.

PTL 3 describes a rubber composition containing, as basic components, at least (i) a diene elastomer, (ii) an inorganic filler as a reinforcing filler and (iii) an alkoxysilane polysulfide (PSAS) as an (inorganic filler/diene elastomer) coupling agent, as combined with (iv) an aldimine (R—CH=N—R) and (v) a guanidine derivative.

Further, PTL 4 proposes a rubber composition basically containing at least (i) a diene elastomer, (ii) an inorganic filer as a reinforcing filer and (iii) an alkoxysilane polysulfide as a coupling agent, as combined with (iv) 1,2-dihydropyridine and (v) a guanidine derivative. PTL 5 proposes a technique of increasing the activity of the coupling function of a silane coupling agent in consideration of kneading conditions.

PTL 6 describes an invention, in which silica having an average particle diameter of 10 μm or less and a specific silane coupling agent are added to a rubber composition, thereby suppressing aggregation of the silica.

PTL 7 proposes a technique, in which silica that preferably has a n-hexadecyltrimethylammonium bromide (CTAB) adsorption specific surface area of from 60 to 250×$10^2$ $m^2$/kg and an tea extract containing catechin are added to a rubber composition, thereby preventing large aggregates of the silica from being present in the rubber composition.

Furthermore, PTL 8 and PTL 9 describe a rubber composition that has such a dispersion state that the area ratio occupied by filler aggregates having a circle-equivalent diameter of 10 μm or more based on the total observed area in a dispersion evaluation method of observing a cut surface of a specimen by a dark field method is 2.0% or less.

However, there is a demand of a technique for further enhancing the low-heat-generation property of a rubber composition containing silica.

CITATION LIST

Patent Literatures

PTL 1: JP-T 2002-521515
PTL 2: JP-T 2002-521516
PTL 3: JP-T 2003-530443
PTL 4: JP-T 2003-523472
PTL 5: WO2008/123306
PTL 6: JP-A 2009-256576
PTL 7: JP-A 2010-031260
PTL 8: JP-A 2010-248422
PTL 9: JP-A 2010-248423

SUMMARY OF INVENTION

Technical Problem

Under the circumstances, an object of the present invention is to provide a rubber composition that is improved in low-heat-generation property.

Solution to Problem

In order to attain the object, the present inventors have paid attention to the dispersion state of silica in a rubber composition, and tried to evaluate the dispersion state of silica by various measurement methods. As a result, it has been found that the low-heat-generation property may be enhanced through reduction of the hysteresis properties (particularly, tan δ) of the rubber composition by making an average aggregated aggregate area according to a particular measurement method to be a particular value or less, and thus the present invention has been completed.

The present invention thus relates to a rubber composition containing: (A) a rubber component containing from 90 to 100% by mass of at least one kind of diene rubber synthesized by solution polymerization and from 0 to 10% by mass of another kind of diene rubber; (B) silica having a n-hexadecyltrimethylammonium bromide (CTAB) adsorption specific surface area of 140 $m^2$/g or more and less than 180 $m^2$/g measured according to a method described in ASTM D3765-92; (C) at least one silane coupling agent selected from a polysulfide compound and a thioester compound; and (D) a vulcanization accelerator, the rubber composition after vulcanization having an average aggregated aggregate area ($nm^2$) of the silica of 2,200 or less.

Measurement method of average aggregated aggregate area:
an upper surface of a specimen of the rubber composition after vulcanization is cut in a direction making an angle of 38° with respect to the upper surface of the specimen with an focused ion beam; then a smooth surface of the specimen formed by cutting is imaged with a scanning electron microscope at an acceleration voltage of 5 kV in a direction perpendicular to the smooth surface; the resulting image is converted to a binarized image of a rubber portion and a silica portion as a filler of the specimen by the Otsu's method; an aggregated aggregate area of the silica portion is obtained based on the resulting binarized image; and the average aggregated aggregate area of the silica portion is calculated in terms of number average (arithmetic average) per unit area (3 µm×3 µm) from a total surface area of the silica portion and the number of aggregated aggregates, provided that in the calculation, a particle that is in contact with an edge of the image is not counted, and a particle of 20 pixels or less is assumed to be noise and is not counted.

Advantageous Effects of Invention

According to the present invention, a rubber composition that is improved in low-heat-generation property may be provided.

DESCRIPTION OF EMBODIMENTS

Figure 1:
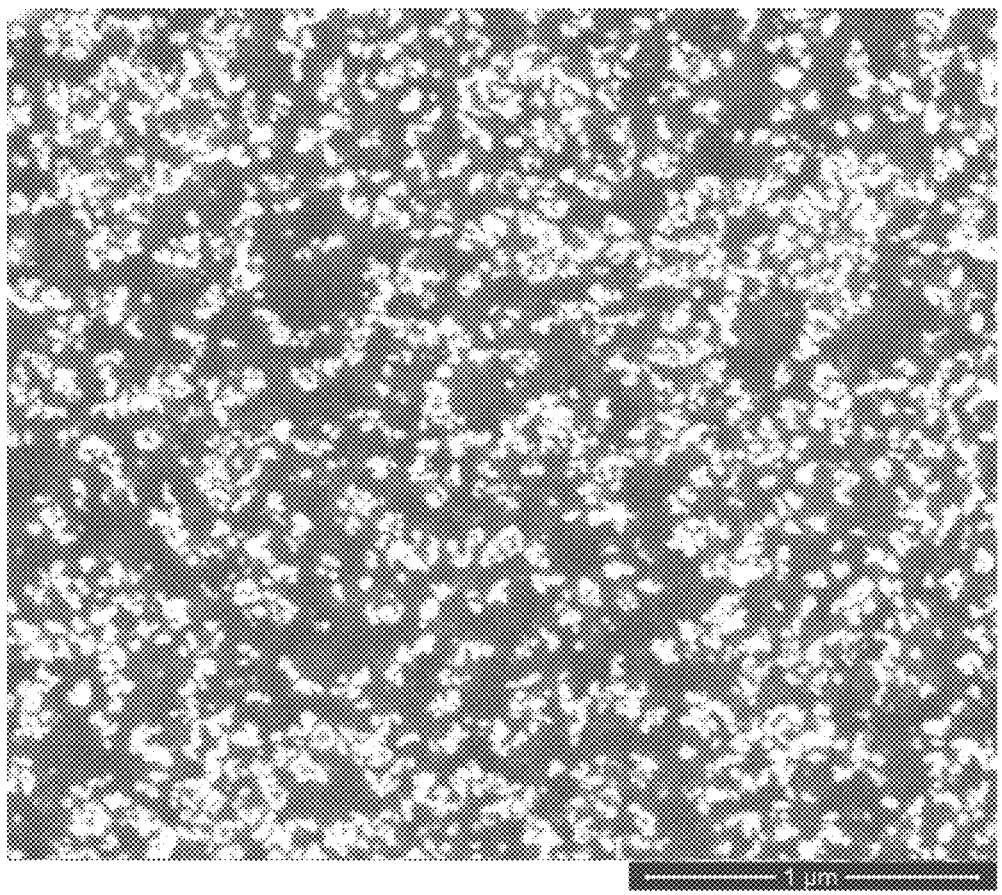
FIG. 1 is a photograph showing an example of an FIB-SEM image obtained by imaging aggregated aggregates of silica in the rubber composition of the present invention by the measurement method of an average aggregated aggregate area according to the present invention.

The present invention will be described in detail below.

The rubber composition of the present invention contains: (A) a rubber component containing from 90 to 100% by mass of at least one kind of diene rubber synthesized by solution polymerization and from 0 to 10% by mass of another kind of diene rubber; (B) silica having a n-hexadecyltrimethylammonium bromide (CTAB) adsorption specific surface area of 140 $m^2/g$ or more and less than 180 $m^2/g$ measured according to a method described in ASTM D3765-92; (C) at least one silane coupling agent selected from a polysulfide compound and a thioester compound; and (D) a vulcanization accelerator, and the rubber composition after vulcanization has an average aggregated aggregate area ($nm^2$) of the silica of 2,200 or less. For further enhancing the low-heat-generation property of the rubber composition, the average aggregated aggregate area ($nm^2$) of the silica is preferably 2,100 or less, and more preferably 2,050 or less. The average aggregated aggregate area ($nm^2$) of the silica is preferably 300 or more, more preferably from 300 to 2,200, further preferably from 300 to 2,100, and particularly preferably from 300 to 2,050.

The measurement method of the average aggregated aggregate area is as follows. An upper surface of a specimen of the rubber composition after vulcanization is cut in a direction making an angle of 38° with respect to the upper surface of the specimen with a focused ion beam, and then a smooth surface of the specimen formed by cutting is imaged with a scanning electron microscope at an acceleration voltage of 5 kV in a direction perpendicular to the smooth surface. The resulting image is converted to a binarized image of a rubber portion and a silica portion as a filler of the specimen by the Otsu's method, an aggregated aggregate area of the silica portion is obtained based on the resulting binarized image, and the average aggregated aggregate area of the silica portion is calculated in terms of number average (arithmetic average) per unit area (3 µm×3 µm) from the total surface area of the silica portion and the number of aggregated aggregates. In the calculation, a particle that is in contact with an edge of the image is not counted, and a particle of 20 pixels or less is assumed to be noise and is not counted.

In the measurement of the average aggregated aggregate area in the present invention, FIB-SEM, which is an integrated equipment of a focused ion beam machining observation device (FIB) and a scanning electron microscope (SEM), is preferably used. The scanning electron microscope (SEM) used is preferably an ultra low acceleration voltage scanning electron microscope.

Examples of the FIB-SEM include "NOVA 200", a trade name (registered trademark), produced by FEI Company, and "SMI-3050MS2", a trade name (registered trademark), produced by SII Nano Technology Inc., and "NOVA 200", a trade name (registered trademark), produced by FEI Company, is preferably used.

For converting to a binarized image, an image processing device by the Otsu's method may be used.

In the measurement of the average aggregated aggregate area in the present invention, The upper surface of the specimen of the rubber composition after vulcanization is cut in a direction making an angle of 38° with respect to the upper surface of the specimen with a focused ion beam, and then a smooth surface of the specimen formed by cutting is imaged with a scanning electron microscope at an acceleration voltage of 5 kV in a direction perpendicular to the smooth surface. In this method, a high precision image of the smooth cross sectional surface of the specimen containing only the surface information of the cross sectional surface without conventional influence of fluctuation in brightness, out of focus and the like. Accordingly, the dispersion state of the filler in the polymer material may be digitalized based on the resulting high precision image, and the average aggregated aggregate area of the rubber composition after vulcanization containing silica may be quantitatively evaluated. In the case where a specimen is cut with FIB, the cut surface that is formed in a direction in parallel to the radiation direction of FIB becomes a smooth surface, and the cut surface that is formed in a direction perpendicular to the radiation direction of FIB becomes a rough surface having unevenness. Accordingly, the smooth surface to be imaged in the present invention means the cut surface that is formed in a direction in parallel to the radiation direction of FIB.

Subsequently, the threshold value for binarization of the resulting image is determined by the Otsu's method. The resulting image is converted to a binarized image of the rubber portion and the silica portion as a filler of the specimen with the threshold value, an aggregated aggregate area of the silica portion is obtained based on the resulting binarized image, and the average aggregated aggregate area of the silica portion is calculated in terms of number average (arithmetic average) per unit area (3 µm×3 µm) from the total surface area of the silica portion and the number of aggregated aggregates. In the calculation, a particle that is in contact with an edge of the image is not counted, and a particle of 20 pixels or less is assumed to be noise and is not counted.

Figure 2:
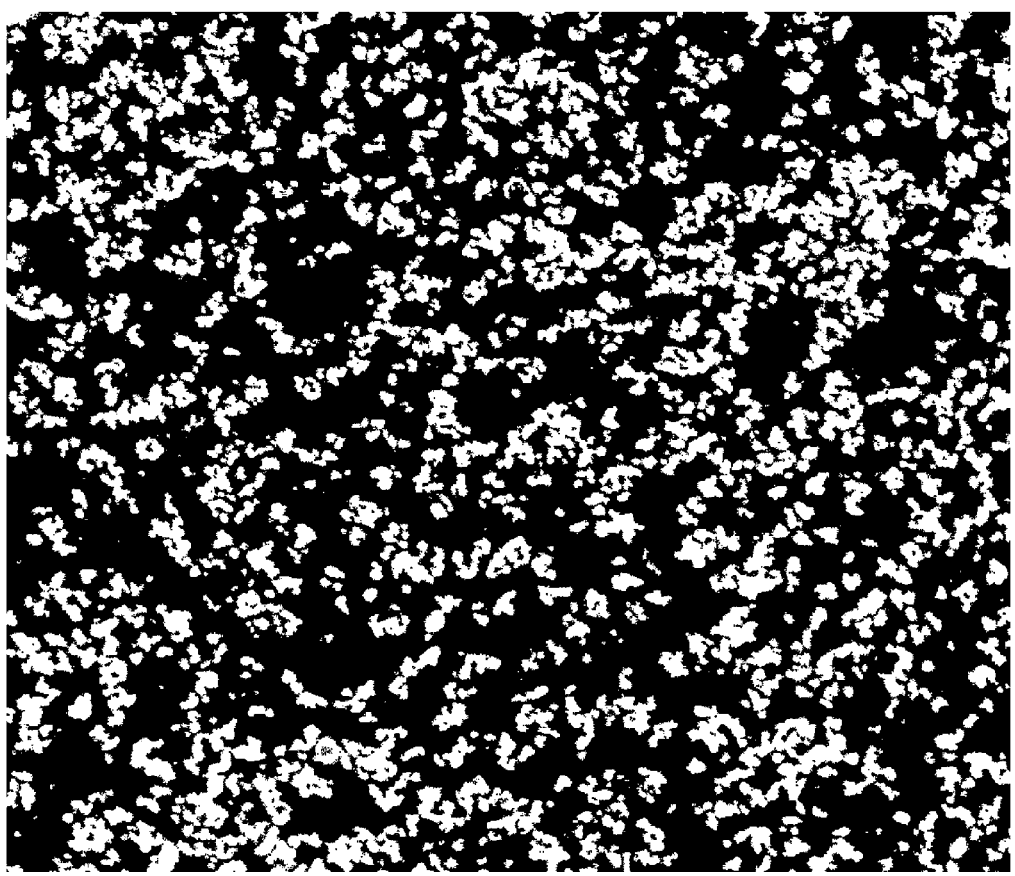
FIG. 2 is a photograph showing an example of a binarized image of the image shown in FIG. 1.

FIG. 1 is a photograph showing an example of an FIB-SEM image obtained by imaging aggregated aggregates of silica in the rubber composition of the present invention by the measurement method of an average aggregated aggregate area according to the present invention, and FIG. 2 is a photograph showing an example of a binarized image of the image shown in FIG. 1.

Figure 3:
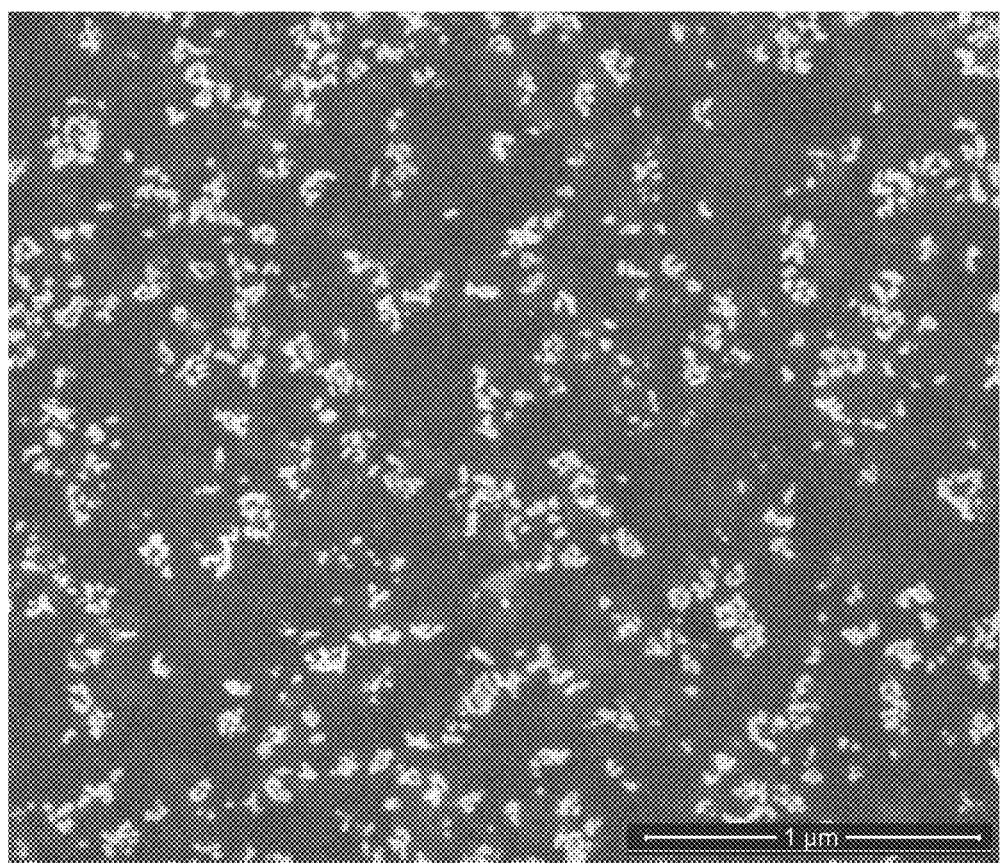
FIG. 3 is a photograph showing a reference example of an FIB-SEM image obtained by imaging aggregated aggregates of silica by the same method as in FIG. 1.
Figure 4:
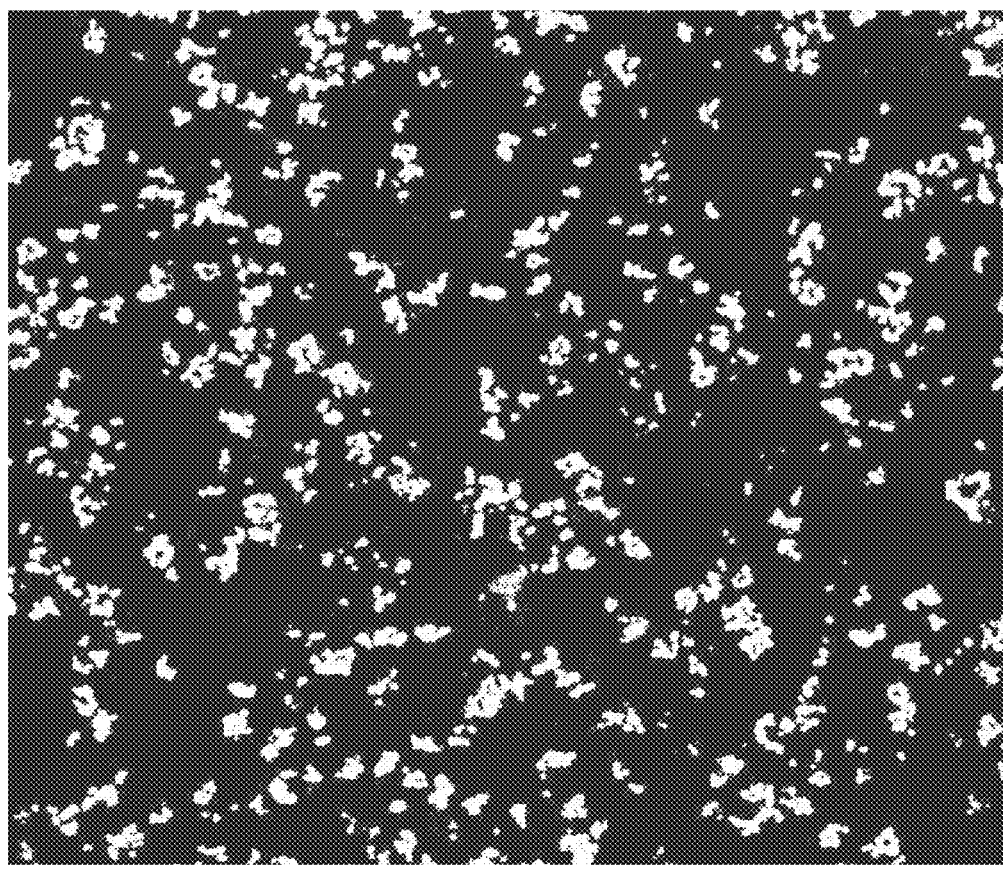
FIG. 4 is a photograph showing an example of a binarized image of the image shown in FIG. 3.

FIG. 3 is a photograph showing a reference example of an FIB-SEM image obtained by imaging aggregated aggregates of silica by the same method as in FIG. 1, and FIG. 4 is a photograph showing an example of a binarized image of the image shown in FIG. 3.

The aggregated aggregate in the present invention means an agglomerated matter of plural aggregates, and encompasses a single aggregate. The aggregate (i.e., a primary aggregated matter) herein means a complex aggregated form of silica formed by fusing primary particles of silica to form linear or irregularly branched chains, and may have a size of from several ten to several hundred nanometers.

The aggregated aggregate in the present invention is far smaller than an agglomerate (i.e., a secondary aggregated matter), which is considered to have, in general, a size of from several ten to several hundred micrometers, and these are concepts that are completely different from each other.

The n-hexadecyltrimethylammonium bromide (CTAB) adsorption specific surface area (which may be hereinafter abbreviated as a "CTAB adsorption specific surface area") of silica is measured according to a method described in ASTM D3765-92, as described above. However, small modifications are made in the method since the method described in ASTM D3765-92 is a method of measuring a CTAB adsorption specific surface area of carbon black. Specifically, IRB #3 (83.0 $m^2/g$) as the standard product of carbon black is not used, but a n-hexadecyltrimethylammonium bromide (CTAB) standard solution is separately prepared, with which an Aerosol OT (sodium di-2-ethylhexyl sulfosuccinate) solution is calibrated, and the specific surface area ($m^2/g$) is calculated from the adsorption amount of CTAB assuming that the adsorption cross section per one molecule of CTAB on the surface of hydrated silicic acid is 0.35 $nm^2$. The modifications are made because it is considered that carbon black and hydrated silicic acid have surfaces that are different from each other, and thus there is a difference therebetween in the CTAB adsorption amount on the same surface area.

[Rubber Component (A)]

The rubber component (A) used in the rubber composition of the present invention contains from 90 to 100% by mass of at least one kind of diene rubber synthesized by solution polymerization and from 0 to 10% by mass of another kind of diene rubber, and the diene rubber synthesized by solution polymerization is preferably at least one kind of rubber selected from unmodified styrene-butadiene copolymer rubber, modified styrene-butadiene copolymer rubber having molecular chain ends modified with a tin compound, polybutadiene rubber (which may be hereinafter referred to as "BR") and synthetic polyisoprene rubber (which may be hereinafter referred to as "IR"), and more preferably solution-polymerized styrene-butadiene copolymer rubber (which may be hereinafter referred to as "solution-polymerized SBR"). The solution-polymerized SBR is preferably unmodified styrene-butadiene copolymer rubber (which may be hereinafter referred to as "unmodified solution-polymerized SBR") and/or modified styrene-butadiene copolymer rubber having molecular chain ends modified with a tin compound (which may be hereinafter referred to as "tin-modified solution-polymerized SBR").

The unmodified solution-polymerized SBR may be obtained by anionic polymerization or coordination polymerization, and is preferably produced by anionic polymerization.

The polymerization initiator used in the anionic polymerization may be an alkali metal compound, and preferably a lithium compound. The lithium compound may be not only an ordinary lithium compound, but also a lithium compound having a tin atom, which may be used for providing the tin-modified solution-polymerized SBR, as described later.

The lithium compound is preferably a hydrocarbyllithium. The use of a hydrocarbyllithium provides styrene-butadiene copolymer rubber having a hydrocarbyl group as a polymerization initiating terminal.

The hydrocarbyllithium used may be one having a hydrocarbyl group having from 2 to 20 carbon atoms, and examples thereof include ethyllithium, n-propyllithium, isopropyllithium, n-butyllithium, sec-butyllithium, tert-butyllithium, tert-octyllithium, n-decyllithium, phenyllithium, 2-naphthyllithium, 2-butyl-phenyllithium, 4-phenyl-butyllithium, cyclohexyllithium, cyclopentyllithium, and a reaction product of diisopropenylbenzene and butyllithium.

A randomizer, which may be arbitrarily selected from known compounds having been ordinarily used, may be used depending on necessity. Specific examples thereof include an ether compound and a tertiary amine compound, such as dimethoxybenzene, tetrahydrofuran, dimethoxyethane, diethylene glycol dibutyl ether, diethylene glycol dimethyl ether, 2,2-bis(2-tetrahydrofuryl)-propane, triethylamine, pyridine, N-methylmorpholine, N,N,N',N'-tetramethylethylenediamine and 1,2-dipiperidinoethane. A potassium salt compound, such as potassium tert-amilate and potassium tert-butoxide, and a sodium salt compound, such as sodium tert-amilate, may also be used.

The production method of the styrene-butadiene copolymer by anionic polymerization is not particularly limited, and known methods may be used. Specifically, styrene and 1,3-butadiene may be anionically polymerized in an organic solvent inert to the reaction, for example, a hydrocarbon solvent, such as an aliphatic, alicyclic or aromatic hydrocarbon compound, with an organic lithium compound as a polymerization initiator, in the presence of the randomizer depending on necessity, thereby providing the target styrene-butadiene copolymer. The temperature in the polymerization reaction is generally selected from a range of from −80 to 150° C., and preferably from −20 to 100° C. The polymerization reaction may be performed under generated pressure, and in general, the operation is preferably performed under such a pressure that is sufficient for maintaining the monomer in a substantially liquid phase. A higher pressure may also be used, and the pressure may be obtained by a suitable method, for example, the reactor may be pressurized with a gas that is inert to the polymerization reaction.

The tin-modified solution-polymerized SBR may be obtained in such a manner that after completing the polymerization reaction of unmodified solution-polymerized SBR obtained above, a tin compound as a modifier is reacted with the polymerization active end of the styrene-butadiene copolymer before terminating the polymerization.

Examples of the tin compound include tin tetrachloride, tributyltin chloride, trioctyltin chloride, dioctyltin dichloride, dibutyltin dichloride and triphenyltin chloride.

The tin-modified solution-polymerized SBR may also be obtained with a lithium compound having a tin atom as the initiator of the anionic polymerization.

Examples of the lithium compound having a tin atom include a triorganotinlithium compound, such as tributyltinlithium and trioctyltinlithium.

The unmodified solution-polymerized SBR and the tin-modified solution-polymerized SBR preferably contain the styrene component in a range of from 5 to 50% by mass, more preferably in a range of from 10 to 50% by mass, and further preferably in a range of from 15 to 45% by mass. The butadiene portion thereof preferably has a vinyl content of 70% by mass or less.

The another kind of diene rubber in the rubber component (A) used in the rubber composition of the present invention is preferably emulsion-polymerized styrene-butadiene copolymer rubber (which may be hereinafter referred to as "emulsion-polymerized SBR") and/or natural rubber. These kinds of diene rubber may be used solely or as a mixture of two or more kinds thereof.

[Silica (B)]

The silica (B) used in the rubber composition of the present invention may be any one of commercially available products, and among these, wet method silica, dry method silica and colloidal silica are preferably used, with wet method silica being more preferably used. Wet method silica is classified into precipitation method silica and gel method silica, and precipitation method silica is particularly preferred since it is easily dispersed in the rubber composition under shearing on kneading and is excellent in reinforcing effect due to the surface reaction after dispersion.

It is characteristic that the CTAB adsorption specific surface area of the silica (B) is 140 m$^2$/g or more and less than 180 m$^2$/g.

Preferred examples of the precipitation method silica that has a CTAB adsorption specific surface area within the range include "Nipsil AQ", a trade name (registered trademark), produced by Tosoh Silica Corporation (CTAB adsorption specific surface area: 160 m$^2$/g) and "Zeosil 1165", a trade name (registered trademark), produced by Rhodia, Inc. (CTAB adsorption specific surface area: 160 m$^2$/g).

The rubber composition of the present invention may contain carbon black depending on necessity in addition to the silica (B). The use of carbon black contained provides such an effect that the electric resistance is lowered to prevent static charge. The carbon black is not particularly limited, and examples thereof include high, medium or low structure carbon black, such as SAF, ISAF, IISAF, N339, HAF, FEF, GPF and SRF grades, with carbon black of SAF, ISAF, IISAF, N339, HAF and FEF grades being particularly preferably used. The carbon black used preferably has a nitrogen adsorption specific surface area ($N_2$SA measured according to JIS K6217-2 (2001)) of from 30 to 250 m$^2$/g. The carbon black may be used solely or as a combination of two or more kinds thereof.

The rubber composition of the present invention preferably contains the silica (B) in an amount of from 25 to 150 parts by mass per 100 parts by mass of the rubber component (A). The amount of 25 parts by mass or more is preferred from the standpoint of securing the wet capability, and the amount of 150 parts by mass or less is preferred from the standpoint of decreasing the rolling resistance. From the viewpoints, the silica (B) is more preferably contained in an amount of from 25 to 120 parts by mass, and further preferably in an amount of 30 to 85 parts by mass, per 100 parts by mass of the rubber component (A).

The rubber composition of the present invention preferably contains a filler, such as carbon black, that is added depending on necessity in addition to the silica (B) in an amount of from 25 to 170 parts by mass per 100 parts by mass of the rubber component (A). The amount of 25 parts by mass or more is preferred from the standpoint of enhancing the reinforcing property of the rubber composition, and the amount of 170 parts by mass or less is preferred from the standpoint of decreasing the rolling resistance.

The amount of the silica (B) in the filler is preferably 40% by mass or more, and more preferably 70% by mass or more, for achieving both the wet capability and the rolling resistance.

[Silane Coupling Agent (C)]

The silane coupling agent (C) used in the rubber composition of the present invention is at least one silane coupling agent that is necessarily selected from a polysulfide compound and a thioester compound. The polysulfide compound and the thioester compound are preferred since they prevent scorch from occurring during kneading, thereby enhancing the processability.

The at least one silane coupling agent (C) selected from a polysulfide compound and a thioester compound is preferably at least one compound selected from the compounds represented by the following general formulae (I) to (IV).

By using the silane coupling agent (C), the rubber composition according to the method of the present invention is further improved in the workability on processing rubber and may provide a pneumatic tire more excellent in wear resistance.

Preferred examples of the polysulfide compound include the compounds represented by the general formula (I) or (III), and preferred examples of the thioester compound include the compounds represented by the general formula (II) or (IV).

The general formulae (I) to (IV) are sequentially described below.

[Chem. 1]

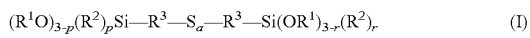
$$(R^1O)_{3-p}(R^2)_p Si—R^3—S_a—R^3—Si(OR^1)_{3-r}(R^2)_r \quad (I)$$

wherein which may be the same or different, each represents a linear, cyclic or branched alkyl group, having from 1 to 8 carbon atoms, or a linear or branched alkoxylalkyl group, having from 2 to 8 carbon atoms; $R^2$, which may be the same or different, each represents a linear, cyclic or branched alkyl group, having from 1 to 8 carbon atoms; $R^3$, which may be the same or different, each represents a linear or branched alkylene group, having from 1 to 8 carbon atoms; a indicates from 2 to 6 as a mean value; p and r, which may be the same or different, each indicates from 0 to 3 as a mean value, provided that both p and r are not 3 at the same time.

Specific examples of the silane coupling agent (C) represented by the above-mentioned general formula (I) include bis(3-triethoxysilylpropyl)tetrasulfide, bis(3-trimethoxysilylpropyl)tetrasulfide, bis(3-methyldimethoxysilylpropyl)tetrasulfide, bis(2-triethoxysilylethyl)tetrasulfide, bis(3-triethoxysilylpropyl)disulfide, bis(3-trimethoxysilylpropyl)disulfide, bis(3-methyldimethoxysilylpropyl)disulfide, bis(2-triethoxysilylethyl)disulfide, bis(3-triethoxysilylpropyl)trisulfide, bis(3-trimethoxysilylpropyl)trisulfide, bis(3-methyldimethoxysilylpropyl)trisulfide, bis(2-triethoxysilylethyl)trisulfide, bis(3-monoethoxydimethylsilylpropyl)tetrasulfide, bis(3-monoethoxydimethylsilylpropyl)trisulfide, bis(3-monoethoxydimethylsilylpropyl)disulfide, bis(3-monomethoxydimethylsilylpropyl)tetrasulfide, bis(3-monomethoxydimethylsilylpropyl)trisulfide, bis(3-monomethoxydimethylsilylpropyl)disulfide, bis(2-monoethoxydimethylsilylethyl)tetrasulfide, bis(2-monoethoxydimethylsilylethyl)trisulfide, bis(2-monoethoxydimethylsilylethyl)disulfide.

[Chem. 2]

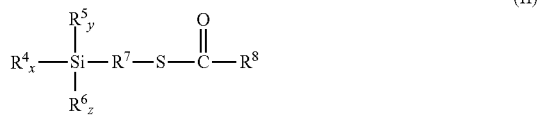

(II)

wherein $R^4$ represents a monovalent group selected from —Cl, —Br, $R^9O$—, $R^9C(=O)O$—, $R^9R^{10}C=NO$—, $R^9R^{10}CNO$—, $R^9R^{10}N$—, and —$(OSiR^9R^{10})_h$ $(OSiR^9R^{10}R^{11})$ (where $R^9$, $R^{10}$ and $R^{11}$, which may be the same or different, each represent a hydrogen atom or a monovalent hydrocarbon group having from 1 to 18 carbon atoms; and h indicates from 1 to 4 as a mean value); $R^5$ represents $R^4$, a hydrogen atom, or a monovalent hydrocarbon group having from 1 to 18 carbon atoms; $R^6$ represents $R^4$, $R^5$, a hydrogen atom, or a group —$[O(R^{12}O)_j]_{0.5}$ (where $R^{12}$ represents an alkylene group having from 1 to 18 carbon atoms; and j indicates an integer of from 1 to 4); $R^7$ represents a divalent hydrocarbon group having from 1 to 18 carbon atoms; $R^8$ represents a monovalent hydrocarbon group having from 1 to 18 carbon atoms; x, y and z each indicate a number satisfying the relationship of $x+y+2z=3$, $0 \leq x \leq 3$, $0 \leq y \leq 2$, $0 \leq z \leq 1$.

In the general formula (II), $R^8$, $R^9$, $R^{10}$ and $R^{11}$, which may be the same or different, each preferably represents a group selected from the group consisting of a linear, cyclic or branched, alkyl, alkenyl, aryl or aralkyl group, having from 1 to 18 carbon atoms. In case where $R^5$ is a monovalent hydrocarbon group having from 1 to 18 carbon atoms, the group is preferably a group selected from the group consisting of a linear, cyclic or branched, alkyl, alkenyl, aryl or aralkyl group. Preferably, $R^{12}$ is a linear, cyclic or branched alkylene group, and is more preferably a linear one. $R^7$ is, for example, an alkylene group having from 1 to 18 carbon atoms, an alkenylene group having from 2 to 18 carbon atoms, a cycloalkylene group having from 5 to 18 carbon atoms, a cycloalkylalkylene group having from 6 to 18 carbon atoms, an arylene group having from 6 to 18 carbon atoms, or an aralkylene group having from 7 to 18 carbon atoms. The alkylene group and the alkenylene group may be linear or branched; and the cycloalkylene group, the cycloalkylalkylene group, the arylene group and the aralkylene group may have a substituent such as a lower alkyl group or the like on the ring thereof. Preferably, $R^7$ is an alkylene group having from 1 to 6 carbon atoms, more preferably a linear alkylene group, for example, a methylene group, an ethylene group, a trimethylene group, a tetramethylene group, a pentamethylene group or a hexamethylene group.

Specific examples of the monovalent hydrocarbon group having from 1 to 18 carbon atoms of $R^5$, $R^8$, $R^9$, $R^{10}$ and $R^{11}$ in the general formula (II) include a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group, a naphthylmethyl group, etc.

Examples of $R^{12}$ in the general formula (II) include a methylene group, an ethylene group, a trimethylene group, a tetramethylene group, a pentamethylene group, a hexamethylene group, an octamethylene group, a decamethylene group, a dodecamethylene group, etc.

Specific examples of the silane coupling agent (C) represented by the general formula (II) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, etc. Of those, especially preferred is 3-octanoylthiopropyltriethoxysilane ("NXT Silane" (registered trade name), produced by Momentive Performance Materials Inc.).

[Chem. 3]

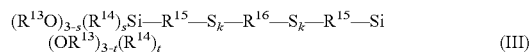

(III)

wherein $R^{13}$, which may be the same or different, each represents a linear, cyclic or branched alkyl group, having from 1 to 8 carbon atoms or a linear or branched alkoxylalkyl group, having from 2 to 8 carbon atoms; $R^{14}$, which may be the same or different, each represents a linear, cyclic or branched alkyl group, having from 1 to 8 carbon atoms; $R^{15}$, which may be the same or different, each represents a linear or branched alkylene group, having from 1 to 8 carbon atoms; $R^{16}$ represents a divalent group of a general formula (—S—$R^{17}$—S—), (—$R^{18}$—$S_{m1}$—$R^{19}$—) or (—$R^{20}$)—$S_{m2}$—$R^{21}$—$S_{m3}$—$R^{22}$—) (where $R^{17}$ to $R^{22}$, which may be the same or different, each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value); k, which may be the same or different, each indicates from 1 to 6 as a mean value; s and t, which may be the same or different, each indicate from 0 to 3 as a mean value, provided that both s and t are not 3 at the same time.

Preferred examples of the silane coupling agent (C) represented by the above-mentioned general formula (III) are compounds represented by an average compositional formula $(CH_3CH_2O)_3Si$—$(CH_2)_3$—$S_2$—$(CH_2)_6$—$S_2$—$(CH_2)_3$—$Si(OCH_2CH_3)_3$, an average compositional formula $(CH_3CH_2O)_3Si$—$(CH_2)_3$—$S_2$—$(CH_2)_{10}$—$S_2$—$(CH_2)_3$—$Si(OCH_2CH_3)_3$, an average compositional formula $(CH_3CH_2O)_3Si$—$(CH_2)_3$—$S_3$—$(CH_2)_6$—$S_3$—$(CH_2)_3$—$Si(OCH_2CH_3)_3$, an average compositional formula $(CH_3CH_2O)_3Si$—$(CH_2)_3$—$S_4$—$(CH_2)_6$—$S_4$—$(CH_2)_3$—$Si(OCH_2CH_3)_3$, an average compositional formula $(CH_3CH_2O)_3Si$—$(CH_2)_3$—S—$(CH_2)_6$—$S_2$—$(CH_2)_6$—S—$(CH_2)_3$—$Si(OCH_2CH_3)_3$, an average compositional formula $(CH_3CH_2O)_3Si$—$(CH_2)_3$—S—$(CH_2)_6$—$S_{2.5}$—$(CH_2)_6$—S—$(CH_2)_3$—$Si(OCH_2CH_3)_3$, an average compositional formula $(CH_3CH_2O)_3Si$—$(CH_2)_3$—S—$(CH_2)_6$—$S_3$—$(CH_2)_6$—S—$(CH_2)_3$—$Si(OCH_2CH_3)_3$, an average compositional formula $(CH_3CH_2O)_3Si$—$(CH_2)_3$—S—$(CH_2)_6$—$S_4$—$(CH_2)_6$—S—$(CH_2)_3$—$Si(OCH_2CH_3)_3$, an average compositional formula $(CH_3CH_2O)_3Si$—$(CH_2)_3$—S—$(CH_2)_{10}$—$S_2$—$(CH_2)_{10}$—S—$(CH_2)_3$—$Si(OCH_2CH_3)_3$, an average compositional formula $(CH_3CH_2O)_3Si$—$(CH_2)_3$—$S_4$—$(CH_2)_6$—$S_4$—$(CH_2)_6$—$S_4$—$(CH_2)_3$—$Si(OCH_2CH_3)_3$, an average compositional formula $(CH_3CH_2O)_3Si$—$(CH_2)_3$—

$S_2$—$(CH_2)_6$—$S_2$—$(CH_2)_6$—$S_2$—$(CH_2)_3$—$Si(OCH_2CH_3)_3$, an average compositional formula $(CH_3CH_2O)_3Si$—$(CH_2)_3$—$S$—$(CH_2)_6$—$S_2$—$(CH_2)_6$—$S_2$—$(CH_2)_6$—$S$—$(CH_2)_3$—$Si(OCH_2CH_3)_3$, etc.

The synthetic example of the silane coupling agent (C) represented by the above general formula (III) is described, for example, in WO2004/000930.

[Chem. 4]

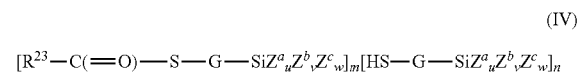

(IV)

wherein $R^{23}$ represents a linear, branched or cyclic alkyl group, having from 1 to 20 carbon atoms; G, which may be the same or different, each represents an alkanediyl group or an alkenediyl group, having from 1 to 9 carbon atoms; $Z^a$, which may be the same or different, each represents a group capable of bonding to the two silicon atoms and selected from [—O—]$_{0.5}$, [—O-G-]$_{0.5}$ and [—O-G-O—]$_{0.5}$; $Z^b$, which may be the same or different, each represents a group which is capable of bonding to the two silicon atoms and is the functional group represented by [—O-G-O—]$_{0.5}$; $Z^c$, which may be the same or different, each represents a functional group selected from —Cl, —Br, —$OR^a$, $R^aC(=O)O$—, $R^aR^bC=NO$—, $R^aR^bN$—, $R^a$— and HO-G-O— (where G is the same as above); $R^a$ and $R^b$, which may be the same or different, each represent a linear, branched or cyclic alkyl group, having from 1 to 20 carbon atoms; m, n, u, v and w, which may be the same or different, each are $1 \leq m \leq 20$, $0 \leq n \leq 20$, $0 \leq u \leq 3$, $0 \leq v \leq 2$, $0 \leq w \leq 1$, and $(u/2)+v+2w$ is 2 or 3; in case where the formula has multiple A's, then $Z^a_u$, $Z^b_v$ and $Z^c_w$ may be the same or different in those multiple A's; in case where the formula has multiple B's, then $Z^a_u$, $Z^b_v$ and $Z^c_w$ may be the same or different in those multiple B's.

Specific examples of the silane coupling agent (C) represented by the general formula (IV) include the following chemical formula (V), chemical formula (VI) and chemical formula (VII):

[Chem. 5]

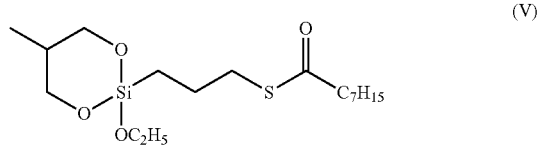

(V)

[Chem. 6]

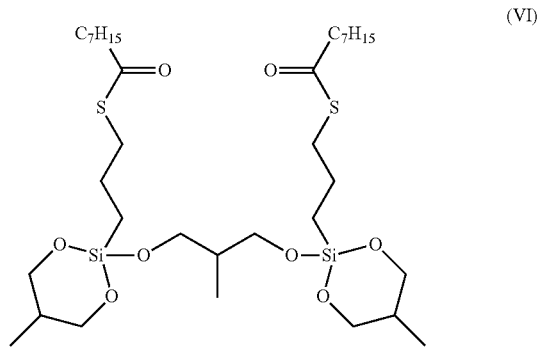

(VI)

[Chem. 7]

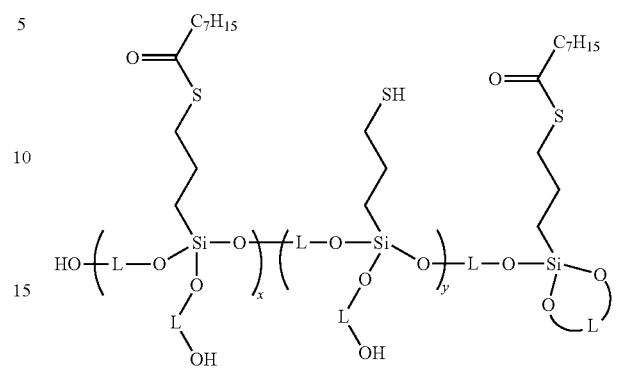

(VII)

In the formula, L each independently represents an alkanediyl group or an alkenediyl group having from 1 to 9 carbon atoms; and x=m and y=n.

As the silane coupling agent represented by the chemical formula (V), a commercial product is available as "NXT Low-V Silane", a trade name (registered trademark), produced by Momentive Performance Materials Inc.

As the silane coupling agent represented by the chemical formula (VI), a commercial product is available as "NXT Ultra Low-V Silane", a trade name (registered trademark), produced by Momentive Performance Materials Inc.

Further, as the silane coupling agent represented by the chemical formula (VII), there is mentioned a commercial product of "NXT-Z", a trade name (registered trademark), produced by Momentive Performance Materials Inc.

The silane coupling agent represented by the general formula (II), the chemical formula (V) or the chemical formula (VI) has a protected mercapto group, and is therefore effective for preventing initial scorching in the processing process before the vulcanization step, and accordingly, the processability thereof is good.

In the silane coupling agent represented by the general formula (V), (VI) or (VII), the carbon number of the alkoxysilane is large, and therefore the amount of the volatile compound VOC (especially alcohol) to be generated from the agent is small, and accordingly, the agent is favorable in point of working environment. Further, the silane coupling agent of the chemical formula (VII) provides a low-heat-generation property as tire performance, and is therefore more preferred.

The silane coupling agent (C) in the present invention is particularly preferably the compound represented by the general formula (I) among the compounds represented by the general formulae (I) to (IV). This is because in the case where the vulcanization accelerator (D) is added in the first step of kneading for enhancing the activity of the silane coupling agent (C), the activation of the polysulfide-bonding site to be reacted with the rubber component is facilitated.

In the present invention, the silane coupling agent (C) may be used solely or as a combination of two or more kinds thereof.

The mixing amount of the silane coupling agent (C) in the rubber composition of the present invention is preferably from 1 to 20% by mass based on the silica. This is because when the amount is less than 1% by mass, it may be difficult to enhance the low-heat-generation property of the rubber composition, and when the amount exceeds 20% by mass, the cost of the rubber composition may be too increased to lower the economical efficiency. The amount is more preferably from 3 to 20% by mass based on the silica, and particularly preferably from 4 to 10% by mass based on the silica.

In the case where the silica (B) having a CTAB adsorption specific surface area of 140 m²/g or more and less than 180 m²/g is used in the rubber composition of the present invention, for providing an average aggregated aggregate area (nm²) of the silica in the rubber composition after vulcanization of 2,200 or less, the production method of the rubber composition is not limited, and the rubber composition may be produced by any kneading method, but the following production methods (1) to (5) are preferred since the rubber composition may be produced with an ordinary equipment with high productivity.

(1) A production method of the rubber composition by kneading the rubber composition through plural steps, in which the rubber component (A), the whole or a part of the silica (B), the whole or a part of the silane coupling agent (C) and the vulcanization accelerator (D) are kneaded in the first step of kneading, where the molar amount of the organic acid compound in the rubber composition in the first step is limited to 1.5 times or less the molar amount of the vulcanization accelerator (D). In this case, the vulcanization accelerator (D) is preferably at least one selected from a guanidine compound, a sulfenamide compound and a thiazole compound.

(2) A production method of the rubber composition by kneading the rubber composition through plural steps, in which the rubber component (A), the whole or a part of the silica (B) and the whole or a part of the silane coupling agent (C) are kneaded in the first step of kneading, and the vulcanization accelerator (D) is added in the course of the first step, followed by further kneading. In this case, the vulcanization accelerator (D) is preferably at least one selected from a guanidine compound, a sulfenamide compound, a thiazole compound, a thiram compound, a dithiocarbamate salt compound, a thiourea compound and a xanthate salt compound.

(3) A production method of the rubber composition by kneading the rubber composition through three or more steps, in which the rubber component (A), the whole or a part of the silica (B) and the whole or apart of the silane coupling agent (C) are kneaded in the first step (X) of kneading; the vulcanization accelerator (D) is added and kneaded in the step (Y) that is the second or later step and before the final step of kneading; and the vulcanization agent is added and kneaded in the final step (Z) of kneading. In this case, the vulcanization accelerator (D) is preferably at least one selected from a guanidine compound, a sulfenamide compound, a thiazole compound, a thiram compound, a dithiocarbamate salt compound, a thiourea compound and a xanthate salt compound.

(4) A production method of the rubber composition by kneading the rubber composition through plural steps, in which the rubber component (A), the whole or a part of the silica (B), the whole or a part of the silane coupling agent (C) and the vulcanization accelerator (D) are kneaded in the first step of kneading. In this case, the vulcanization accelerator (D) is preferably at least one selected from a guanidine compound, a sulfenamide compound, a thiazole compound, a thiram compound, a dithiocarbamate salt compound, a thiourea compound and a xanthate salt compound. In the method (4), the following production method (5) is preferably performed.

(5) A production method of the rubber composition by kneading the rubber composition through plural steps, in which the rubber component (A), the whole or a part of the silica (B), the whole or a part of the silane coupling agent (C) and the vulcanization accelerator (D) are kneaded in the first step of kneading, where the molar amount of the organic acid compound in the rubber composition in the first step is limited to 1.5 times or less the molar amount of the vulcanization accelerator (D). In this case, the vulcanization accelerator (D) is preferably at least one selected from a guanidine compound, a sulfenamide compound, a thiazole compound, a thiram compound, a dithiocarbamate salt compound, a thiourea compound and a xanthate salt compound.

In the production methods (1) to (5), the step of kneading before the final step, such as the first step and the second step, is a process step where the raw materials other than the reagents that contribute to crosslinking (e.g., the vulcanizing agent and vulcanization accelerator) are mixed and kneaded, and is a process step for performing dispersion of the filler to the rubber composition for reinforcing the rubber component. The step of kneading that is second or later step and before the final step does not include a step of kneading that performs only kneading without addition of any raw material and does not include a special mixing method, such as a wet master batch.

The maximum temperature of the rubber composition in the step of kneading before the final step, such as the first step and the second step, is preferably from 120 to 190° C., more preferably from 130 to 175° C., and further preferably from 150 to 170° C. The kneading time is preferably from 0.5 to 20 minutes, more preferably from 0.5 to 10 minutes, and further preferably from 0.5 to 5 minutes.

The final step of kneading is a process step where the reagents that contribute to crosslinking (e.g., the vulcanizing agent and vulcanization accelerator) are mixed and kneaded. The maximum temperature of the rubber composition in the final step is preferably from 60 to 140° C., more preferably from 80 to 120° C., and further preferably from 100 to 120° C. The kneading time is preferably from 0.5 to 20 minutes, more preferably from 0.5 to 10 minutes, and further preferably from 0.5 to 5 minutes.

[Vulcanization Accelerator (D)]

As the vulcanization accelerator (D) which can be used for the rubber composition of the present invention, preferred examples include guanidines, sulfenamides, thiazoles, thiurams, dithiocarbamate salts, thioureas and xanthate salts.

Examples of the guanidines for use in the rubber composition of the present invention include 1,3-diphenylguanidine, 1,3-di-o-tolylguanidine, 1-o-tolylbiguanide, dicatechol borate di-o-tolylguanidine salt, 1,3-di-o-cumenylguanidine, 1,3-di-o-biphenylguanidine, 1,3-di-o-cumenyl-2-propionylguanidine, etc. Preferred are 1,3-diphenylguanidine, 1,3-di-o-tolylguanidine and 1-o-tolylbiguanide as having high reactivity.

Examples of the sulfenamides for use in the rubber composition of the present invention include N-cyclohexyl-2-benzothiazolylsulfenamide, N,N-dicyclohexyl-2-benzothiazolylsulfenamide, N-tert-butyl-2-benzothiazolylsulfenamide, N-oxydiethylene-2-benzothiazolylsulfenamide, N-methyl-2-benzothiazolylsulfenamide, N-ethyl-2-benzothiazolylsulfenamide, N-propyl-2-benzothiazolylsulfenamide, N-butyl-2-benzothiazolylsulfenamide, N-pentyl-2-benzothiazolylsulfenamide, N-hexyl-2-benzothiazolylsulfenamide, N-pentyl-2-benzothiazolylsulfenamide, N-octyl-2-benzothiazolylsulfenamide, N-2-ethylhexyl-2-benzothiazolylsulfenamide, N-decyl-2-benzothiazolylsulfenamide, N-dodecyl-2-benzothiazolylsulfenamide, N-stearyl-2-benzothiazolylsulenamide, N,N-dimethyl-2-benzothiazolylsulenamide, N,N-diethyl-2-benzothiazolylsulenamide, N,N-dipropyl-2- benzothiazolylsulenamide, N,N-dibutyl-2-benzothiazolylsulenamide, N,N-dipentyl-2-benzothiazolylsulenamide, N,N-dihexyl-2-benzothiazolylsulenamide, N,N-dipentyl-2-benzothiazolylsulenamide, N,N-dioctyl-2-benzothiazolylsulenamide, N,N-di-2-ethylhexylbenzothiazolylsulfenamide, N-decyl-2-benzothiazolylsulenamide, N,N-didodecyl-2-benzothiazolylsulenamide, N,N-distearyl-2-benzothiazolylsulenamide, etc. Of those, preferred are N-cyclohexyl-2-benzothiazolylsulenamide and N-tert-butyl-2-benzothiazolylsulenamide, as having high reactivity.

Examples of the thiazoles for use in the rubber composition of the present invention include 2-mercaptobenzothiazole, di-2-benzothiazolyl disulfide, 2-mercaptobenzothiazole zinc salt, 2-mercaptobenzothiazole cyclohexylamine salt, 2-(N,N-diethylthiocarbamoylthio)benzothiazole, 2-(4'-morpholinodithio)benzothiazole, 4-methyl-2-mercaptobenzothiazole, di-(4-methyl-2-benzothiazolyl)disulfide, 5-chloro-2-mercaptobenzothiazole, 2-mercaptobenzothiazole sodium, 2-mercapto-6-nitrobenzothiazole, 2-mercapto-naphtho[1,2-d]thiazole, 2-mercapto-5-methoxybenzothiazole, 6-amino-2-mercaptobenzothiazole, etc. Of those, preferred are 2-mercaptobenzothiazole and di-2-benzothiazolyl disulfide, as having high reactivity.

Examples of the thiurams for use in the rubber composition of the present invention include tetramethylthiuram disulfide, tetraethylthiuram disulfide, tetrapropylthiuram disulfide, tetraisopropylthiuram disulfide, tetrabutylthiuram disulfide, tetrapentylthiuram disulfide, tetrahexylthiuram disulfide, tetraheptylthiuram disulfide, tetraoctylthiuram disulfide, tetranonylthiuram disulfide, tetradecylthiuram disulfide, tetradodecylthiuram disulfide, tetrastearylthiuramdisulfide, tetrabenzylthiuram disulfide, tetrakis(2-ethylhexyl)thiuram disulfide, tetramethylthiuram monosulfide, tetraethylthiuram monosulfide, tetrapropylthiuram monosulfide, tetraisopropylthiuram monosulfide, tetrabutylthiuram monosulfide, tetrapentylthiuram monosulfide, tetrahexylthiuram monosulfide, tetraheptylthiuram monosulfide, tetraoctylthiuram monosulfide, tetranonylthiurammonosulfide, tetradecylthiuram-monosulfide, tetradodecylthiuram monosulfide, tetrastearylthiuram monosulfide, tetrabenzylthiuram monosulfide, dipentamethylenethiuram tetrasulfide, etc. Of those, preferred are tetrakis(2-ethylhexyl)thiuram disulfide and tetrabenzylthiuram disulfide, as having high reactivity.

Examples of the dithiocarbamate salts for use in the rubber composition of the present invention include zinc dimethyldithiocarbamate, zinc diethyldithiocarbamate, zinc dipropyldithiocarbamate, zinc diisopropyldithiocarbamate, zinc dibutyldithiocarbamate, zinc dipentyldithiocarbamate, zinc dihexyldithiocarbamate, zinc diheptyldithiocarbamate, zinc dioctyldithiocarbamate, zinc di(2-ethylhexyl)dithiocarbamate, zinc didecyldithiocarbamate, zinc didodecyldithiocarbamate, zinc N-pent amethylenedithiocarbamate, zinc N-ethyl-N-phenyldithiocarbamate, zinc dibenzyldithiocarbamate, copper dimethyldithiocarbamate, copper diethyldithiocarbamate, copper dipropyldithiocarbamate, copper diisopropyldithiocarbamate, copper dibutyldithiocarbamate, copper dipentyldithiocarbamate, copper dihexyldithiocarbamate, copper diheptyldithiocarbamate, copper dioctyldithiocarbamate, copper di(2-ethylhexyl)dithiocarbamate, copper didecyldithiocarbamate, copper didodecyldithiocarbamate, copper N-pent amethylenedithiocarbamate, copper dibenzyldithiocarbamate, sodium dimethyldithiocarbamate, sodium diethyldithiocarbamate, sodium dipropyldithiocarbamate, sodium diisopropyldithiocarbamate, sodium dibutyldithiocarbamate, sodium dipentyldithiocarbamate, sodium dihexyldithiocarbamate, sodium diheptyldithiocarbamate, sodium dioctyldithiocarbamate, sodium di(2-ethylhexyl)dithiocarbamate, sodium didecyldithiocarbamate, sodium didodecyldithiocarbamate, sodium N-pentamethylenedithiocarbamate, sodium dibenzyldithiocarbamate, ferric dimethyldithiocarbamate, ferric diethyldithiocarbamate, ferric dipropyldithiocarbamate, ferric diisopropyldithiocarbamate, ferric dibutyldithiocarbamate, ferric dipentyldithiocarbamate, ferric dihexyldithiocarbamate, ferric diheptyldithiocarbamate, ferric dioctyldithiocarbamate, ferric di(2-ethylhexyl)dithiocarbamate, ferric didecyldithiocarbamate, ferric didodecyldithiocarbamate, ferric N-pentamethylenedithiocarbamate, ferric dibenzyldithiocarbamate, etc. Of those, preferred are zinc dibenzyldithiocarbamate, zinc N-ethyl-N-phenyldithiocarbamate, zinc dimethyldithiocarbamate and copper dimethyldithiocarbamate, as having high reactivity.

Examples of the thioureas for use in the rubber composition of the present invention include N,N'-diphenylthiourea, trimethylthiourea, N,N'-diethylthiourea, N,N'-dimethylthiourea, N,N'-dibutylthiourea, ethylenethiourea, N,N'-diisopropylthiourea, N,N'-dicyclohexylthiourea, 1,3-di(o-tolyl)thiourea, 1,3-di(p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, o-tolylthiourea, etc. Of those, preferred are N,N'-diethylthiourea, trimethylthiourea, N,N'-diphenylthiourea and N,N'-dimethylthiourea, as having high reactivity.

Examples of the xanthate salts for use in the rubber composition of the present invention include zinc methylxanthate, zinc ethylxanthate, zinc propylxanthate, zinc isopropylxanthate, zinc butylxanthate, zinc pentylxanthate, zinc hexylxanthate, zinc heptylxanthate, zinc octylxanthate, zinc 2-ethylhexylxanthate, zinc decylxanthate, zinc dodecylxanthate, potassium methylxanthate, potassium ethylxanthate, potassium propylxanthate, potassium isopropylxanthate, potassium butylxanthate, potassium pentylxanthate, potassium hexylxanthate, potassium heptylxanthate, potassium octylxanthate, potassium 2-ethylhexylxanthate, potassium decylxanthate, potassium dodecylxanthate, sodium methylxanthate, sodium ethylxanthate, sodium propylxanthate, sodium isopropylxanthate, sodium butylxanthate, sodium pentylxanthate, sodium hexylxanthate, sodium heptylxanthate, sodium octylxanthate, sodium 2-ethylhexylxanthate, sodium decylxanthate, sodium dodecylxanthate, etc. Of those, preferred is zinc isopropylxanthate, as having high reactivity.

The rubber composition of the present invention preferably contains the vulcanization accelerator (D) in an amount of from 0.1 to 10 parts by mass, and more preferably from 0.2 to 7 parts by mass, per 100 parts by mass of the rubber component (A). From 0.1 to 5 parts by mass of the vulcanization accelerator (D) thereof is preferably added in the step before the final step of kneading, and from 0.1 to 5 parts by mass thereof is preferably added in the final step of kneading.

[Organic Acid Compound]

Examples of the organic acid compound added to the rubber composition of the present invention include an organic acid selected from a saturated fatty acid or an unsaturated fatty acid, such as stearic acid, palmitic acid, lauric acid, arachidinic acid, behenic acid, lignoceric acid, capric acid, pelargonic acid, caprylic acid, enanthic acid, caproic acid, oleic acid, vaccenic acid, linoleic acid, linolenic acid and nervonic acid, and a resin acid, such as rosin acid and modified rosin acid, a metal salt and an ester of the organic acid, and a phenol derivative.

In the present invention, it is necessary to exhibit the function of the vulcanization accelerator sufficiently, and therefore, 50% by mol or more of the organic acid compound is preferably stearic acid.

In the rubber composition of the present invention, various additives that are generally incorporated in a rubber composition, for example, a vulcanization activator such as zinc flower or the like, an antioxidant and others may be optionally added and kneaded in the first stage or the final stage of kneading, or in the intermediate stage between the first stage and the final stage.

As the kneading apparatus for the present invention, usable is any of a Banbury mixer, a roll, an intensive mixer, etc.

EXAMPLE

The present invention will be described in more detail with reference to examples below, but the present invention is not limited to the examples.

The average aggregated aggregate area and the low-heat-generation property (tan δ index) of the vulcanized rubber composition were evaluated in the following manners.

<Average Aggregated Aggregate Area of Vulcanized Rubber Composition>

A specimen of the vulcanized rubber composition was produced by cutting a vulcanized rubber sheet with a razor. The size of the specimen was 5 mm×5 mm×1 mm (thickness).

The upper surface of the specimen was cut in a direction making an angle of 38° with respect to the upper surface of the specimen with an focused ion beam under condition of a voltage of 30 kV by using FIB-SEM (NOVA 200, produced by FEI Company). The smooth surface of the specimen formed by cutting was imaged with an SEM at an acceleration voltage of 5 kV in a direction perpendicular to the smooth surface. The resulting image was converted to a binarized image of the rubber portion and the silica portion as a filler of the specimen by the Otsu's method, an aggregated aggregate area of the silica portion was obtained based on the resulting binarized image, and the average aggregated aggregate area of the silica portion was calculated in terms of number average (arithmetic average) per unit area (3 μm×3 μm) from the total surface area of the silica portion and the number of aggregated aggregates. In the calculation, a particle that was in contact with an edge of the image was not counted, and a particle of 20 pixels or less was assumed to be noise and was not counted.

<Low-Heat-Generation Property (tan δ index)>

Using a viscoelasticity measuring device (produced by Rheometric), tan δ of the rubber composition sample was measured at a temperature of 60° C., at a dynamic strain of 5% and at a frequency of 15 Hz. Based on the reciprocal of tan δ in Comparative Example 1, 6, 11, 15, 20, 25 or 30, as referred to 100, the data were expressed as index indication according to the following formula. The samples having a larger index value have a better low-heat-generation property and have a smaller hysteresis loss.

Low-Heat-Generation Index={(tan δ of vulcanized rubber composition of Comparative Example 1, 6, 11, 15, 20, 25 or 30)/(tan δ of vulcanized rubber composition tested)}×100

The raw materials used in Examples 1 to 7 and Comparative Examples 1 to 34 are abbreviated as follows.

(1) Emulsion-polymerized SBR-1: emulsion-polymerized styrene-butadiene copolymer rubber (SBR), "#1500", a trade name, produced by JSR Corporation (2) Unmodified solution-polymerized SBR-2: solution-polymerized styrene-butadiene copolymer rubber (SBR), "Tufdene 2000", a trade name, produced by Asahi Kasei Corporation (3) Tin-modified solution-polymerized SBR-3: solution-polymerized styrene-butadiene copolymer rubber (SBR), "SL 563", a trade name, produced by JSR Corporation (4) Carbon black N220: "#80", a trade name, produced by Asahi Carbon Co., Ltd.

(5) Silica-1: "Zeosil 1165", a trade name (registered trademark), produced by Rhodia, Inc. (CTAB adsorption specific surface area: 160 m$^2$/g)

(6) Silica-2: "Nipsil AQ", a trade name (registered trademark), produced by Tosoh Silica Corporation (CTAB adsorption specific surface area: 160 m$^2$/g)

(7) Silane coupling agent Si75: bis(3-triethoxysilylpropyl) disulfide (average sulfur chain length: 2.35), silane coupling agent, "Si75", a trade name (registered trademark), produced by Evonik Industries AG (8) Anti-aging agent 6PPD: N-(1,3-dimethylbutyl)-N'-phenyl-p-phenylenediamine, "Nocrac 6C", a trade name, produced by Ouchi Shinko Chemical Industrial Co., Ltd.

(9) 1,3-Diphenylguanidine: "Sanceler D", a trade name, produced by Sanshin Chemical Industry Co., Ltd.

(10) Anti-aging agent TMDQ: polymerized 2,2,4-trimethyl-1,2-dihydroquinoline, "Nocrac 224", a trade name, produced by Ouchi Shinko Chemical Industrial Co., Ltd.

(11) Vulcanization accelerator MBTS: di-2-benzothiazolyl disulfide, "Sanceler DM", a trade name, produced by Sanshin Chemical Industry Co., Ltd.

(12) Vulcanization accelerator TBBS: N-tert-butyl-2-benzothiazolylsulfenamide, "Sanceler NS", a trade name, produced by Sanshin Chemical Industry Co., Ltd.

Example 1

In the first step of kneading, with a Banbury mixer, 100 parts by mass of the unmodified solution-polymerized SBR-2 as the rubber component (A), 10 parts by mass of the carbon black N220, 50 parts by mass of the silica-1 as the silica (B), 4 parts by mass of the silane coupling agent Si75 as the silane coupling agent (C) and 30 parts by mass of an aromatic oil were kneaded for 60 seconds, and then 1 part by mass of 1,3-diphenylguanidine, which is a guanidine compound, as the vulcanization accelerator (D) was added and further kneaded, in which the maximum temperature of the rubber composition in the first step of kneading was regulated to 150° C.

Subsequently, in the final step of kneading, 2 parts by mass of stearic acid, 1 part by mass of the anti-aging agent 6PPD, 1 part by mass of the anti-aging agent TMDQ, 2.5 parts by mass of zinc flower, 0.6 part by mass of 1,3-diphenylguanidine, 1 part by mass of the vulcanization accelerator MBTS, 0.6 part by mass of the vulcanization accelerator TBBS and 1.5 parts by mass of sulfur were added, in which the maximum temperature of the rubber composition in the final step of kneading was regulated to 110° C.

The vulcanized rubber composition obtained from the rubber composition was evaluated for the average aggregated aggregate area and the low-heat-generation property (tan δ index) according to the aforementioned manners. The results are shown in Table 1.

Comparative Example 1

The kneading operation was performed in the same manner as in Example 1, except that 1 part by mass of 1,3-diphenylguanidine was not added in the first step of kneading, 2 parts by mass of stearic acid and 1 part by mass of the anti-aging agent 6PPD were not added in the final step of kneading, and 2 parts by mass of stearic acid and 1 part by mass of the anti-aging agent 6PPD were added in the first step of kneading. The resulting vulcanized rubber composition was evaluated for the average aggregated aggregate area and the low-heat-generation property (tan δ index) according to the aforementioned manners. The results are shown in Table 1.

Comparative Example 2

The kneading operation was performed in the same manner as in Comparative Example 1, except that 25 parts by mass of the emulsion-polymerized SBR-1 and 75 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 1.

Comparative Example 3

The kneading operation was performed in the same manner as in Comparative Example 1, except that 50 parts by mass of the emulsion-polymerized SBR-1 and 50 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 1.

Comparative Example 4

The kneading operation was performed in the same manner as in Comparative Example 1, except that 67 parts by mass of the emulsion-polymerized SBR-1 and 33 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 1.

Comparative Example 5

The kneading operation was performed in the same manner as in Comparative Example 1, except that 100 parts by mass of the emulsion-polymerized SBR-1 was used as the rubber component (A). The resulting vulcanized rubber composition was evaluated for the average aggregated aggregate area and the low-heat-generation property (tan δ index) according to the aforementioned manners. The results are shown in Table 1.

Example 2

The kneading operation was performed in the same manner as in Example 1, except that 50 parts by mass of Silica-2 was used as silica (B) in the first step of kneading. The resulting vulcanized rubber composition was evaluated for the average aggregated aggregate area and the low-heat-generation property (tan δ index) according to the aforementioned manners. The results are shown in Table 2.

Comparative Example 6

The kneading operation was performed in the same manner as in Example 2, except that 1 part by mass of 1,3-diphenylguanidine was not added in the first step, and 2 parts by mass of stearic acid and 1 part by mass of the anti-aging agent 6PPD were not added in the final step of kneading, and 2 parts by mass of stearic acid and 1 part by mass of the anti-aging agent 6 PPD were added in the first step of kneading. The resulting vulcanized rubber composition was evaluated for the average aggregated aggregate area and the low-heat-generation property (tan δ index) according to the aforementioned manners. The results are shown in Table 2.

Comparative Example 7

The kneading operation was performed in the same manner as in Comparative Example 6, except that 25 parts by mass of the emulsion-polymerized SBR-1 and 75 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 2.

Comparative Example 8

The kneading operation was performed in the same manner as in Comparative Example 6, except that 50 parts by mass of the emulsion-polymerized SBR-1 and 50 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 2.

Comparative Example 9

The kneading operation was performed in the same manner as in Comparative Example 6, except that 67 parts by mass of the emulsion-polymerized SBR-1 and 33 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 2.

Comparative Example 10

The kneading operation was performed in the same manner as in Comparative Example 6, except that 100 parts by mass of the emulsion-polymerized SBR-1 were used as the rubber component (A). The resulting vulcanized rubber composition was evaluated for the average aggregated aggregate area and the low-heat-generation property (tan δ index) according to the aforementioned manners. The results are shown in Table 2.

Example 3

The kneading operation was performed in the same manner as in Example 1, except that 100 parts by mass of the tin-modified solution-polymerized SBR-3 were used as the rubber component (A). The resulting vulcanized rubber composition was evaluated for the average aggregated aggregate area and the low-heat-generation property (tan δ index) according to the aforementioned manners. The results are shown in Table 3.

Comparative Example 11

The kneading operation was performed in the same manner as in Comparative Example 1, except that 100 parts by mass of the tin-modified solution-polymerized SBR-3 were used as the rubber component (A). The resulting vulcanized rubber composition was evaluated for the average aggregated aggregate area and the low-heat-generation property (tan δ index) according to the aforementioned manners. The results are shown in Table 3.

Comparative Example 12

The kneading operation was performed in the same manner as in Comparative Example 1, except that 25 parts by mass of the emulsion-polymerized SBR-1 and 75 parts by mass of the tin-modified solution-polymerized SBR-2 were used as the rubber component (A). The kneading operation was performed in the same manner as in comparative example 2, except that 100 parts by mass of tin-modified solution-polymerized SBR-3 was used as the rubber component (A). The resulting vulcanized rubber composition was evaluated for the average aggregated aggregate area and the low-heat-generation property (tan δ index) according to the aforementioned manners. The results are shown in Table 3.

Comparative Example 13

The kneading operation was performed in the same manner as in Comparative Example 1, except that 50 parts by mass of the emulsion-polymerized SBR-1 and 50 parts by mass of the tin-modified solution-polymerized SBR-3 were used as the rubber component (A). The resulting vulcanized rubber composition was evaluated for the average aggregated aggregate area and the low-heat-generation property (tan δ index) according to the aforementioned manners. The results are shown in Table 3.

Comparative Example 14

The kneading operation was performed in the same manner as in Comparative Example 1, except that 67 parts by mass of the emulsion-polymerized SBR-1 and 33 parts by mass of the tin-modified solution-polymerized SBR-3 were used as the rubber component (A). The resulting vulcanized rubber composition was evaluated for the average aggregated aggregate area and the low-heat-generation property (tan δ index) according to the aforementioned manners. The results are shown in Table 3.

[Table 1]

TABLE 1

| | Example | Comparative Example | | | | |
|---|---|---|---|---|---|---|
| | 1 | 1 | 2 | 3 | 4 | 5 |
| Average aggregated aggregate area of vulcanized rubber composition (nm$^2$) | 2000 | 2400 | 2400 | 2400 | 2400 | 2400 |
| Vulcanization property: low-heat-generation property (tanδ index) | 120 | 100 | 100 | 100 | 100 | 100 |

TABLE 2

| | Example | Comparative Example | | | | |
|---|---|---|---|---|---|---|
| | 2 | 6 | 7 | 8 | 9 | 10 |
| Average aggregated aggregate area of vulcanized rubber composition (nm$^2$) | 1700 | 2500 | 2500 | 2500 | 2500 | 2500 |
| Vulcanization property: low-heat-generation property (tanδ index) | 125 | 100 | 100 | 100 | 100 | 100 |

TABLE 3

| | Example | Comparative Example | | | |
|---|---|---|---|---|---|
| | 3 | 11 | 12 | 13 | 14 |
| Average aggregated aggregate area of vulcanized rubber composition (nm$^2$) | 1900 | 2400 | 2400 | 2400 | 2400 |
| Vulcanization property: low-heat-generation property (tanδ index) | 123 | 100 | 100 | 100 | 100 |

Example 4

In the first step of kneading, with a Banbury mixer, 100 parts by mass of the unmodified solution-polymerized SBR-2 as the rubber component (A), 30 parts by mass of the carbon black N220, 30 parts by mass of the silica-1 as the silica (B), 2 parts by mass of the silane coupling agent Si75 as the silane coupling agent (C) and 30 parts by mass of an aromatic oil were kneaded for 60 seconds, and then 1 part by mass of 1,3-diphenylguanidine, which is a guanidine compound, as the vulcanization accelerator (D) was added and further kneaded, in which the maximum temperature of the rubber composition in the first step of kneading was regulated to 150° C.

Subsequently, in the final step of kneading, 2 parts by mass of stearic acid, 1 part by mass of the anti-aging agent 6PPD, 1 part by mass of the anti-aging agent TMDQ, 2.5 parts by mass of zinc flower, 1 part by mass of the vulcanization accelerator MBTS, 0.6 part by mass of the vulcanization accelerator TBBS and 1.5 parts by mass of sulfur were added, in which the maximum temperature of the rubber composition in the final step of kneading was regulated to 110° C.

The vulcanized rubber composition obtained from the rubber composition was evaluated for the average aggregated aggregate area and the low-heat-generation property (tan δ index) according to the aforementioned manners. The results are shown in Table 4.

Comparative Example 15

The kneading operation was performed in the same manner as in Example 4, except that 1 part by mass of 1,3-diphenylguanidine was not added in the first step of kneading, 2 parts by mass of stearic acid and 1 part by mass of the anti-aging agent 6PPD were not added in the final step of kneading, and 2 parts by mass of stearic acid and 1 part by mass of the anti-aging agent 6PPD were added in the first step of kneading. The resulting vulcanized rubber composition was evaluated for the average aggregated aggregate area and the low-heat-generation property (tan δ index) according to the aforementioned manners. The results are shown in Table 3.

Comparative Example 16

The kneading operation was performed in the same manner as in Comparative Example 15, except that 25 parts by mass of the emulsion-polymerized SBR-1 and 75 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 4.

Comparative Example 17

The kneading operation was performed in the same manner as in Comparative Example 15, except that 50 parts by mass of the emulsion-polymerized SBR-1 and 50 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 4.

Comparative Example 18

The kneading operation was performed in the same manner as in Comparative Example 15, except that 67 parts by mass of the emulsion-polymerized SBR-1 and 33 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 4.

Comparative Example 19

The kneading operation was performed in the same manner as in Comparative Example 15, except that 100 parts by mass of the emulsion-polymerized SBR-1 was used as the rubber component (A). The resulting vulcanized rubber composition was evaluated for the average aggregated aggregate area and the low-heat-generation property (tan δ index) according to the aforementioned manners. The results are shown in Table 3.

Example 5

In the first step of kneading, with a Banbury mixer, 100 parts by mass of the unmodified solution-polymerized SBR-2 as the rubber component (A), 10 parts by mass of the carbon black N220, 75 parts by mass of the silica-2 as the silica (B), 6 parts by mass of the silane coupling agent Si75 as the silane coupling agent (C) and 30 parts by mass of an aromatic oil were kneaded for 60 seconds, and then 1 part by mass of 1,3-diphenylguanidine, which is a guanidine compound, as the vulcanization accelerator (D) was added and further kneaded, in which the maximum temperature of the rubber composition in the first step of kneading was regulated to 150° C.

Subsequently, in the final step of kneading, 2 parts by mass of stearic acid, 1 part by mass of the anti-aging agent 6PPD, 1 part by mass of the anti-aging agent TMDQ, 2.5 parts by mass of zinc flower, 0.6 part by mass of 1,3-diphenylguanidine, 1 part by mass of the vulcanization accelerator MBTS, 0.6 part by mass of the vulcanization accelerator TBBS and 1.5 parts by mass of sulfur were added, in which the maximum temperature of the rubber composition in the final step of kneading was regulated to 110° C.

The vulcanized rubber composition obtained from the rubber composition was evaluated for the average aggregated aggregate area and the low-heat-generation property (tan δ index) according to the aforementioned manners. The results are shown in Table 5.

Comparative Example 20

The kneading operation was performed in the same manner as in Example 5, except that 1 part by mass of 1,3-diphenylguanidine was not added in the first step of kneading, 2 parts by mass of stearic acid and 1 part by mass of the anti-aging agent 6PPD were not added in the final step of kneading, and 2 parts by mass of stearic acid and 1 part by mass of the anti-aging agent 6PPD were added in the first step of kneading. The resulting vulcanized rubber composition was evaluated for the average aggregated aggregate area and the low-heat-generation property (tan δ index) according to the aforementioned manners. The results are shown in Table 5.

Comparative Example 21

The kneading operation was performed in the same manner as in Comparative Example 20, except that 25 parts by mass of the emulsion-polymerized SBR-1 and 75 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 4.

Comparative Example 22

The kneading operation was performed in the same manner as in Comparative Example 20, except that 50 parts by mass of the emulsion-polymerized SBR-1 and 50 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 5.

Comparative Example 23

The kneading operation was performed in the same manner as in Comparative Example 20, except that 67 parts by mass of the emulsion-polymerized SBR-1 and 33 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 5.

Comparative Example 24

The kneading operation was performed in the same manner as in Comparative Example 20, except that 100 parts by mass of the emulsion-polymerized SBR-1 was used as the rubber component (A). The resulting vulcanized rubber composition was evaluated for the average aggregated aggregate area and the low-heat-generation property (tan δ index) according to the aforementioned manners. The results are shown in Table 4.

Example 6

In the first step of kneading, with a Banbury mixer, 100 parts by mass of the unmodified solution-polymerized SBR-2 as the rubber component (A), 5 parts by mass of the carbon black N220, 100 parts by mass of the silica-2 as the silica (B), 8 parts by mass of the silane coupling agent Si75 as the silane coupling agent (C) and 40 parts by mass of an aromatic oil were kneaded for 60 seconds, and then 1 part by mass of 1,3-diphenylguanidine, which is a guanidine compound, as the vulcanization accelerator (D) was added and further kneaded, in which the maximum temperature of the rubber composition in the first step of kneading was regulated to 150° C.

Subsequently, in the final step of kneading, 2 parts by mass of stearic acid, 1 part by mass of the anti-aging agent 6PPD, 1 part by mass of the anti-aging agent TMDQ, 2.5 parts by mass of zinc flower, 0.9 part by mass of 1,3-diphenylguanidine, 1 part by mass of the vulcanization accelerator MBTS, 0.6 part by mass of the vulcanization accelerator TBBS and 1.5 parts by mass of sulfur were added, in which the maximum temperature of the rubber composition in the final step of kneading was regulated to 110° C.

The vulcanized rubber composition obtained from the rubber composition was evaluated for the average aggregated aggregate area and the low-heat-generation property (tan δ index) according to the aforementioned manners. The results are shown in Table 6.

Comparative Example 25

The kneading operation was performed in the same manner as in Example 6, except that 1 part by mass of 1,3-diphenylguanidine was not added in the first step of kneading, 2 parts by mass of stearic acid and 1 part by mass of the anti-aging agent 6PPD were not added in the final step of kneading, and 2 parts by mass of stearic acid and 1 part by mass of the anti-aging agent 6PPD were added in the first step of kneading. The resulting vulcanized rubber composition was evaluated for the average aggregated aggregate area and the low-heat-generation property (tan δ index) according to the aforementioned manners. The results are shown in Table 6.

Comparative Example 26

The kneading operation was performed in the same manner as in Comparative Example 25, except that 25 parts by mass of the emulsion-polymerized SBR-1 and 75 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 6.

Comparative Example 27

The kneading operation was performed in the same manner as in Comparative Example 25, except that 50 parts by mass of the emulsion-polymerized SBR-1 and 50 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 6.

Comparative Example 28

The kneading operation was performed in the same manner as in Comparative Example 25, except that 67 parts by mass of the emulsion-polymerized SBR-1 and 33 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 6.

Comparative Example 29

The kneading operation was performed in the same manner as in Comparative Example 25, except that 100 parts by mass of the emulsion-polymerized SBR-1 was used as the rubber component (A). The resulting vulcanized rubber composition was evaluated for the average aggregated aggregate area and the low-heat-generation property (tan δ index) according to the aforementioned manners. The results are shown in Table 6.

Example 7

In the first step of kneading, with a Banbury mixer, 100 parts by mass of the unmodified solution-polymerized SBR-2 as the rubber component (A), 5 parts by mass of the carbon black N220, 120 parts by mass of the silica-2 as the silica (B), 9.6 parts by mass of the silane coupling agent Si75 as the silane coupling agent (C) and 50 parts by mass of an aromatic oil were kneaded for 60 seconds, and then 1 part by mass of 1,3-diphenylguanidine, which is a guanidine compound, as the vulcanization accelerator (D) was added and further kneaded, in which the maximum temperature of the rubber composition in the first step of kneading was regulated to 150° C.

Subsequently, in the final step of kneading, 2 parts by mass of stearic acid, 1 part by mass of the anti-aging agent 6PPD, 1 part by mass of the anti-aging agent TMDQ, 2.5 parts by mass of zinc flower, 1.2 parts by mass of 1,3-diphenylguanidine, 1.2 part by mass of the vulcanization accelerator MBTS, 0.7 part by mass of the vulcanization accelerator TBBS and 1.7 parts by mass of sulfur were added, in which the maximum temperature of the rubber composition in the final step of kneading was regulated to 110° C.

The vulcanized rubber composition obtained from the rubber composition was evaluated for the average aggregated aggregate area and the low-heat-generation property (tan δ index) according to the aforementioned manners. The results are shown in Table 7.

Comparative Example 30

The kneading operation was performed in the same manner as in Example 7, except that 1 part by mass of 1,3-diphenylguanidine was not added in the first step of kneading, 2 parts by mass of stearic acid and 1 part by mass of the anti-aging agent 6PPD were not added in the final step of kneading, and 2 parts by mass of stearic acid and 1 part by mass of the anti-aging agent 6PPD were added in the first step of kneading. The resulting vulcanized rubber composition was evaluated for the average aggregated aggregate area and the low-heat-generation property (tan δ index) according to the aforementioned manners. The results are shown in Table 7.

Comparative Example 31

The kneading operation was performed in the same manner as in Comparative Example 30, except that 25 parts by mass of the emulsion-polymerized SBR-1 and 75 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 7.

Comparative Example 32

The kneading operation was performed in the same manner as in Comparative Example 30, except that 50 parts by mass of the emulsion-polymerized SBR-1 and 50 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 7.

Comparative Example 33

The kneading operation was performed in the same manner as in Comparative Example 30, except that 67 parts by mass of the emulsion-polymerized SBR-1 and 33 parts by mass of the unmodified solution-polymerized SBR-2 were used as the rubber component (A). The resulting vulcanized rubber composition was evaluated for the average aggregated aggregate area and the low-heat-generation property (tan δ index) according to the aforementioned manners. The results are shown in Table 7.

Comparative Example 34

The kneading operation was performed in the same manner as in Comparative Example 30, except that 100 parts by mass of the emulsion-polymerized SBR-1 was used as the rubber component (A). The resulting vulcanized rubber composition was evaluated for the average aggregated aggregate area and the low-heat-generation property (tan δ index) according to the aforementioned manners. The results are shown in Table 7.

[Table 2]

TABLE 4

| | Example | Comparative Example | | | | |
|---|---|---|---|---|---|---|
| | 4 | 15 | 16 | 17 | 18 | 19 |
| Average aggregated aggregate area of vulcanized rubber composition (nm$^2$) | 1650 | 2420 | 2420 | 2430 | 2430 | 2430 |
| Vulcanization property: low-heat-generation property (tanδ index) | 120 | 100 | 100 | 100 | 100 | 100 |

TABLE 5

| | Example | Comparative Example | | | | |
|---|---|---|---|---|---|---|
| | 5 | 20 | 21 | 22 | 23 | 24 |
| Average aggregated aggregate area of vulcanized rubber composition (nm$^2$) | 1800 | 2570 | 2570 | 2580 | 2590 | 2590 |
| Vulcanization property: low-heat-generation property (tanδ index) | 129 | 100 | 100 | 100 | 100 | 100 |

TABLE 6

| | Example | Comparative Example | | | | |
|---|---|---|---|---|---|---|
| | 6 | 25 | 26 | 27 | 28 | 29 |
| Average aggregated aggregate area of vulcanized rubber composition (nm$^2$) | 1900 | 2700 | 2700 | 2700 | 2700 | 2700 |
| Vulcanization property: low-heat-generation property (tanδ index) | 128 | 100 | 100 | 100 | 100 | 100 |

TABLE 7

| | Example | Comparative Example | | | | |
|---|---|---|---|---|---|---|
| | 7 | 30 | 31 | 32 | 33 | 34 |
| Average aggregated aggregate area of vulcanized rubber composition (nm$^2$) | 2000 | 2780 | 2780 | 2780 | 2780 | 2780 |
| Vulcanization property: low-heat-generation property (tanδ index) | 126 | 100 | 100 | 100 | 100 | 100 |

As apparent from Tables 1 to 3, the rubber composition of Examples 1 to 3 have good low-heat-generation property (tan δ index) as compared to the rubber compositions of Comparative Examples 1 to 14.

As apparent from Tables 4 to 7, the rubber composition of Example 4 has good low-heat-generation property (tan δ index) as compared to the rubber compositions of Comparative Examples to 19, the rubber composition of Example 5 has good low-heat-generation property (tan δ index) as compared to the rubber compositions of Comparative Examples 20 to 24, the rubber composition of Example 6 has good low-heat-generation property (tan δ index) as compared to the rubber compositions of Comparative Examples 25 to 29, and the rubber composition of Example 7 has good low-heat-generation property (tan δ index) as compared to the rubber compositions of Comparative Examples 30 to 34.

INDUSTRIAL APPLICABILITY

The rubber composition of the present invention is excellent in low-heat-generation property, and thus is favorably used as members of pneumatic tires for a passenger car, a pickup truck, a kei car, a kei truck and a heavy vehicle (such as a truck, a bus and a construction vehicle), and particularly a tread member of a pneumatic radial tire.

The invention claimed is:

1. A rubber composition comprising: (A) a rubber component containing from 90 to 100% by mass of at least one kind of diene rubber synthesized by solution polymerization and from 0 to 10% by mass of another kind of diene rubber; (B) a silica having a n-hexadecyltrimethylammonium bromide (CTAB) adsorption specific surface area of 140 m$^2$/g or more and less than 180 m$^2$/g measured according to a method described in ASTM D3765-92; (C) at least one silane coupling agent selected from a polysulfide compound and a thioester compound; and (D) a vulcanization accelerator, the rubber composition after vulcanization having an average aggregated aggregate area (nm$^2$) of the silica of 2,200 or less,
   measurement method of average aggregated aggregate area:
      an upper surface of a specimen of the rubber composition after vulcanization is cut in a direction making an angle of 38° with respect to the upper surface of the specimen with an focused ion beam; then a smooth surface of the specimen formed by cutting is imaged with a scanning electron microscope at an acceleration voltage of 5 kV in a direction perpendicular to the smooth surface; the resulting image is converted to a binarized image of a rubber portion and a silica portion as a filler of the specimen by the Otsu's method; an aggregated aggregate area of the silica portion is obtained based on the resulting binarized image; and the average aggregated aggregate area of the silica portion is calculated in terms of number average (arithmetic average) per unit area (3 μm×3 μm) from a total surface area of the silica portion and the number of aggregated aggregates, provided that in the calculation, a particle that is in contact with an edge of the image is not counted, and a particle of 20 pixels or less is assumed to be noise and is not counted.

2. The rubber composition according to claim 1, wherein the diene rubber synthesized by solution polymerization is at least one kind of rubber selected from unmodified styrene-butadiene copolymer rubber, modified styrene-butadiene copolymer rubber having molecular chain ends modified with a tin compound, unmodified polybutadiene rubber, modified polybutadiene rubber having molecular chain ends modified with a tin compound, unmodified synthetic polyisoprene rubber and modified synthetic polyisoprene rubber having molecular chain ends modified with a tin compound.

3. The rubber composition according to claim 1, wherein the another kind of diene rubber is emulsion-polymerized styrene-butadiene copolymer rubber and/or natural rubber.

4. The rubber composition according to claim 1, wherein the silane coupling agent (C) is at least one compound selected from the compounds represented by the following general formulae (I) to (IV):

[Chem. 1]

$$(R^1O)_{3-p}(R^2)_p Si-R^3-S_a-R^3-Si(OR^1)_{3-r}(R^2)_r \quad (I)$$

wherein R$^1$, which may be the same or different, each represents a linear, cyclic or branched alkyl group, having from 1 to 8 carbon atoms, or a linear or branched alkoxylalkyl group, having from 2 to 8 carbon atoms; R$^2$, which may be the same or different, each represents a linear, cyclic or branched alkyl group, having from 1 to 8 carbon atoms; R$^3$, which may be the same or different, each represents a linear or branched alkylene group, having from 1 to 8 carbon atoms; a indicates from 2 to 6 as a mean value; p and r, which may be the same or different, each indicates from 0 to 3 as a mean value, provided that both p and r are not 3 at the same time,

[Chem. 2]

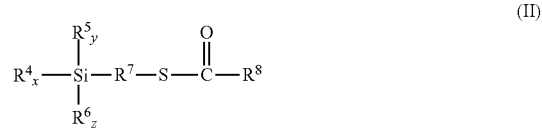

wherein R$^4$ represents a monovalent group selected from —Cl, —Br, R$^9$O—, R$^9$C(=O)O—, R$^9$R$^{10}$C=NO—, R$^9$R$^{10}$CNO—, R$^9$R$^{10}$N—, and —(OSiR$^9$R$^{10}$)$_h$(OSiR$^9$R$^{10}$R$^{11}$) (where R$^9$, R$^{10}$ and R$^{11}$, which may be the same or different, each represent a hydrogen atom or a monovalent hydrocarbon group having from 1 to 18 carbon atoms; and h indicates from 1 to 4 as a mean value); R$^5$ represents R$^4$, a hydrogen atom, or a monovalent hydrocarbon group having from 1 to 18 carbon atoms; R$^6$ represents R$^4$, R$^5$, a hydrogen atom, or a group —[O(R$^{12}$O)$_j$]$_{0.5}$ (where R$^{12}$ represents an alkylene group having from 1 to 18 carbon atoms; and j indicates an integer of from 1 to 4); R$^7$ represents a divalent hydrocarbon group having from 1 to 18 carbon atoms; R$^8$ represents a monovalent hydrocarbon group having from 1 to 18 carbon atoms; x, y and z each indicate a number satisfying the relationship of x+y+2z=3, 0≤x≤3, 0≤y≤2, 0≤z≤1,

[Chem. 3]

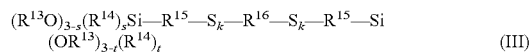

$$(R^{13}O)_{3-s}(R^{14})_s Si-R^{15}-S_k-R^{16}-S_k-R^{15}-Si(OR^{13})_{3-t}(R^{14})_t \quad (III)$$

wherein R$^{13}$, which may be the same or different, each represents a linear, cyclic or branched alkyl group, having from 1 to 8 carbon atoms or a linear or branched alkoxylalkyl group, having from 2 to 8 carbon atoms; R$^{14}$, which may be the same or different, each represents a linear, cyclic or branched alkyl group, having from 1 to 8 carbon atoms; R$^{15}$, which may be the same or different, each represents a linear or branched alkylene group, having from 1 to 8 carbon atoms; R$^{16}$ represents a divalent group of a general formula (—S—R$^{17}$—S—), (—R$^{18}$—S$_{m1}$—R$^{19}$—) or (R$^{20}$—S$_{m2}$—R$^{21}$—S$_{m3}$—R$^{22}$—) (where R$^{17}$ to R$^{22}$, which may be the same or different, each represents a divalent hydrocarbon group, a divalent aromatic group or a divalent organic group containing a hetero element except sulfur and oxygen, having from 1 to 20 carbon atoms; m1, m2 and m3 may be the same or different, each indicating from 1 to less than 4 as a mean value); k, which may be the same or different, each indicates from 1 to 6 as a mean value; s and t, which may be the same or different, each indicate from 0 to 3 as a mean value, provided that both s and t are not 3 at the same time,

[Chem. 4]

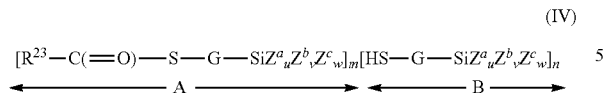

(IV)

wherein $R^{23}$ represents a linear, branched or cyclic alkyl group, having from 1 to 20 carbon atoms; G, which may be the same or different, each represents an alkanediyl group or an alkenediyl group, having from 1 to 9 carbon atoms; $Z^a$, which may be the same or different, each represents a group capable of bonding to the two silicon atoms and selected from $[—O—]_{0.5}$, $[—O\text{-}G\text{-}]_{0.5}$ and $[—O\text{-}G\text{-}O—]_{0.5}$; $Z^b$, which may be the same or different, each represents a group which is capable of bonding to the two silicon atoms and is the functional group represented by $[—O\text{-}G\text{-}O—]_{0.5}$; $Z^c$, which may be the same or different, each represents a functional group selected from —Cl, —Br, —$OR^a$, $R^a C(=O))—$, $R^a R^b C=NO—$, $R^a R^b N—$, $R^a—$ and HO-G-O— (where G is the same as above); $R^a$ and $R^b$, which may be the same or different, each represent a linear, branched or cyclic alkyl group, having from 1 to 20 carbon atoms; m, n, u, v and w, which may be the same or different, each are $1 \leq m \leq 20$, $0 \leq n \leq 20$, $0 \leq u \leq 3$, $0 \leq v \leq 2$, $0 \leq w \leq 1$, and $(u/2)+v+2w$ is 2 or 3; in case where the formula has multiple A's, then $Z^a_u$, $Z^b_v$ and $Z^c_w$ may be the same or different in those multiple A's; in case where the formula has multiple B's, then $Z^a_u$, $Z^b_v$ and $Z^c_w$ may be the same or different in those multiple B's.

5. The rubber composition according to claim 4, wherein the silane coupling agent (C) is a compound represented by the general formula (I).

6. The rubber composition according to claim 1, wherein the rubber composition contains the silica (B) in an amount of from 25 to 150 parts by mass per 100 parts by mass of the rubber component (A).

7. The rubber composition according to claim 1, wherein the silica (B) is precipitation method silica.

8. The rubber composition according to claim 1, wherein the rubber composition further comprises carbon black.

* * * * *